United States Patent [19]

Hazenbroek

[11] 4,203,178
[45] May 20, 1980

[54] GIZZARD PROCESSING SYSTEM

[76] Inventor: Jacobus E. Hazenbroek, Burg. De Zeeuwstaat 52, Numansdorp, Netherlands

[21] Appl. No.: 927,825

[22] Filed: Jul. 25, 1978

[51] Int. Cl.² .................................................. A22C 21/00
[52] U.S. Cl. ............................................. 17/50; 17/11; 17/43
[58] Field of Search ...................... 17/11, 43, 50

[56] References Cited

U.S. PATENT DOCUMENTS

| | | | |
|---|---|---|---|
| 3,172,148 | 3/1965 | Hill | 17/11 |
| 3,629,902 | 12/1971 | Leonard | 17/11 X |
| 3,990,128 | 11/1976 | Van Mill | 17/43 |
| 4,057,875 | 11/1977 | Hill | 17/43 |

*Primary Examiner*—Willie G. Abercrombie
*Attorney, Agent, or Firm*—Jones, Thomas & Askew

[57] ABSTRACT

Poultry gizzards with gut and stomachs attached thereto are moved in sequence along a path, first with the gut and stomach suspended freely below the gizzards. As the gizzards continuing to move along the path, the gut and stomach are cut from the gizzards, a cut is made upwardly into the lower portion of the gizzards, and the cut-apart lower portions of the gizzards are lifted and separated to remove loose matter from inside the gizzards. The gizzards are then peeled. A pair of side-by-side parallel rolls with externally protruding spiral threads are used to initially orient the gizzards and locate the gut and stomach below the gizzards and chain conveyors subsequently move the gizzards through the system as the gut and stomach are severed from the gizzards, the cut is made upwardly into the gizzard, and the cut side portions of the gizzards are lifted for cleaning.

6 Claims, 7 Drawing Figures

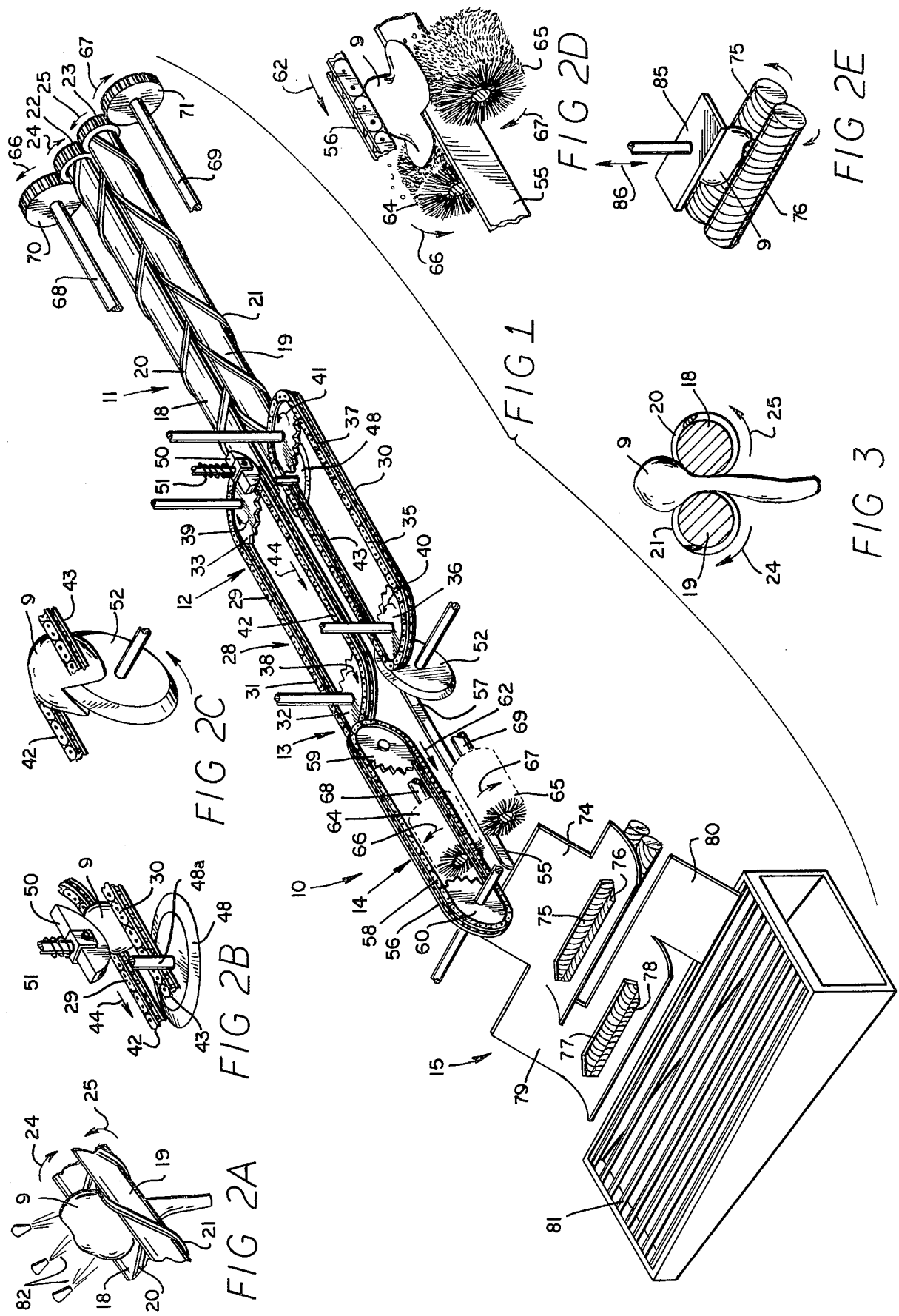

GIZZARD PROCESSING SYSTEM

BACKGROUND OF THE INVENTION

This invention relates to improvements in processing poultry gizzards, wherein gizzards that have been extracted from chickens or other poultry with gut and stomach still attached thereto are moved through a processing path where the gut and stomach are severed from the gizzards, the gizzards are cut or "split" and loose material removed therefrom, and the gizzards are peeled.

In the past, gizzards have been removed from poultry and processed separately, as by pulling or severing the gut and stomach away from the gizzard, splitting the gizzard, and peeling the gizzard. Prior art patents which disclose equipment for performing these functions include U.S. Pat. Nos. 3,172,148, 3,406,425 and 3,411,828 of C. J. Hill. The various equipment utilized in the gizzard processing steps includes a trough-like structure wherein gizzards are placed with a stream of water flowing downwardly through the trough causing the lighter stomachs to precede the more dense gizzard, so that the gizzard and stomach are oriented with a stomach in front for reception by subsequent equipment. The gizzards are then transferred from the trough to a conveyor system where the stomach is pulled or otherwise severed from the gizzard and the upper surface of the gizzard is cut into to split the gizzard, and the halves of the gizzard are opened by guide bars and the gizzard washed.

While the prior art gizzard processing equipment has been successful to some extent, the gizzards are not always oriented correctly as they pass through the prior art equipment and the stomachs and gut are not always properly removed from the gizzards. One of the problems in the prior art equipment is the initial orientation of the gizzard and its attached stomach so that the stomach leads the gizzard to the subsequent equipment and the transfer of the gizzard from the trough to the equipment.

SUMMARY OF THE INVENTION

Briefly described, the present invention comprises a method and apparatus for processing poultry gizzards wherein the gizzards, with gut and stomach attached thereto, are received and oriented with the stomachs suspended below the gizzards and with the portion of the gizzard to which the stomach is attached oriented downwardly. The gizzards are then passed in sequence over a horizontally extending blade whereupon the gut and stomach are severed from the gizzards, the gizzards are then passed over a vertical blade which cuts upwardly into the lower portion of the gizzard to split the gizzard, and the gizzards are then passed over a rectilinear guide, urged down into engagement with the guide so that the gizzards tend to straddle the guide, and the cut-apart halves of the gizzards are urged or brushed upwardly to open the gizzards and dislodge loose matter that may be in the gizzards. The gizzards are subsequently dropped onto counter-rotational peeler rolls whereupon they are peeled.

Thus, it is an object of this invention to provide an improved method of processing gizzards, wherein the gizzards are accurately and reliably separated from their attached stomachs and gut, and wherein the loose matter within the gizzards is removed.

Another object of this invention is to provide improved apparatus for treating gizzards, which apparatus is effective to rapidly, effectively and accurately remove the stomach and gut from each gizzard, and split and clean each gizzard.

Other objects, features and advantages of the present invention will become apparent upon reading the following specification, when taken in conjunction with the accompanying drawing.

BRIEF DESCRIPTION OF THE DRAWING

FIG. 1 is a schematic perspective illustration of the gizzard processing apparatus.

FIGS. 2A–2E are schematic perspective detail illustrations of various portions of the gizzard processing apparatus of FIG. 1.

FIG. 3 is an end cross sectional illustration of the spiral rolls of the gizzard processing apparatus, illustrating how a gizzard and its attached stomach and gut are oriented on the rolls.

DETAILED DESCRIPTION OF AN EMBODIMENT

Referring now in more detail to the drawings, in which like numerals indicate like parts throughout the several views, FIG. 1 illustrates a gizzard processing apparatus 10 which includes an infeed section 11, a first cutting section 12, a second cutting section 13, a cleaning section 14, and a peeling section 15. Infeed section 11 comprises a pair of horizontal, parallel conveyor rolls 18 and 19 positioned in closely spaced side-by-side relationship, and an externally protruding spiral thread 20 and 21 is located on each of the conveyor rolls 18 and 19. The spiral thread 20 is oriented in the opposite direction of rotation about its roll 18 when compared to the orientation of the spiral thread 21. Gears 22 and 23 are rigidly mounted on the ends of conveyor rolls 18 and 19 and their teeth engage one another so that the conveyor rolls 18 and 19 rotate in unison but in opposite directions of rotation as indicated by arrows 24 and 25, so that the adjacent portions of the conveyor rolls 18 and 19 move downwardly. This direction of rotation together with the direction of the spiral threads 20 and 21 of the conveyor rolls causes objects placed on the conveyor rolls to be be moved from right to left (FIG. 1) on into the first cutting section 12 of the gizzard processing apparatus 10. Thus, the infeed section 11 with its counter-rotating conveyor rolls 18 and 19 functions as conveyor means for moving the gizzards in sequence along the beginning of a rectilinear path extending through the gizzard processing apparatus.

First chain conveyor means 28 extends between first cutting section 12 and second cutting section 13 and comprises a pair of endless chain conveyors 29 and 30. The endless chain conveyor 29 includes conveyor chain 31 which extends about end sprockets 32 and 33. The sprockets 32 and 33 are rotatable about upwardly extending axes. In a similar manner, the endless chain conveyor 30 includes conveyor chain 35 extending about end sprockets 36 and 37, with the sprockets 36 and 37 rotatable about upwardly extending axes. The sprockets 32, 33 and 36, 37 are rotated in the directions indicated by arrows 38, 39, 40 and 41 so that the adjacent flights 42 and 43 of the chains 29 and 30 move in the direction indicated by arrow 44, which is a continuation of the rectilinear path extending from infeed section 11.

As the conveyor chains 29 and 30 move about their respective sprockets 33 and 37 and begin to move along their flights 42 and 43, the chains will engage and carry with them the gizzards or other objects received from the infeed section 11 of the gizzard processing apparatus 10.

Cutting disc 48 is rotatable about a vertical axis and is located just beneath the lower flights 42 and 43 of the chains of the first chain conveyor means 28. The cutting disc 48 is rotated at a high angular velocity and functions to cut just beneath the gizzards passing along the first chain conveyor means 28, to sever the stomach and gut from the gizzards. Presser foot assembly 50 is located above the flight 42 and 43 of the conveyor chains and tends to urge the gizzards received in the first chain conveyor means 28 down toward engagement with the cutting disc 48, to assure that the cut made between the gizzard and the gut and stomach is high on the bottom of the gizzard to remove substantially all of the gut and stomach from the gizzard. Thus, the presser foot 50, which is spring-urged downwardly by coil spring 51, functions as a means for urging the gizzards toward cutting disc 48, and the cutting disc 48 functions as cutting means for removing the gut and stomach from the gizzards.

Second cutting disc 52 is located adjacent the outfeed end of first chain conveyor means 28 and is oriented in a vertical plane and is rotatable about a horizontal axis which is perpendicular to the path of movement of the gizzards through the gizzard processing apparatus 10. Second cutting disc 52 has its upper curved edge projecting up between the flights 42 and 43 of the endless conveyor chains 29 and 30 so as to cut upwardly into the bottom of the gizzards moving through the first chain conveyor means 28, so as to "split" or cut deeply into the gizzards and to open up the gizzards for removal of the loose matter normally present in poultry gizzards. The gizzards are firmly held by the first chain conveyor means 28 as the cuts are made by first cutting disc 48 to cut away the gut and stomach and by second cutting disc 52 to split the gizzard.

Second chain conveyor means 54 is located adjacent the first chain conveyor means 28 and includes a rectilinear bottom guide or track 55 and an upper chain conveyor 56. The rectilinear bottom guide 55 has its infeed end 57 in juxtaposed alignment with second cutting disc 52 so that the gizzards which have been split by the second cutting disc 52 will tend to ride onto the bottom guide 55 and the cut portion of the gizzards straddle guide 55. Upper chain conveyor 56 includes endless chain 58 extending about end sprockets 59 and 60, with the sprockets 59 and 60 rotating about horizontal axes that are perpendicular to the direction of movement of the gizzards through the gizzard processing apparatus 10. The lower flight 61 of the upper chain conveyor 56 moves in the direction indicated by arrow 62 which is parallel to the path of movement of the gizzards through the gizzard processing apparatus 10, and the lower flight 61 moves closely adjacent the bottom guide 55, so as to urge the gizzards straddling the bottom guide 55 toward engagement with the bottom guide and along the length of the bottom guide and along the rectilinear path through the processing apparatus 10.

Cleaning brushes 64 and 65 are mounted on opposite sides of bottom guide 55, are rotatable about axes extending parallel to the direction of movement of the gizzards through the gizzard processing apparatus 10, and are rotated in counter directions of rotation as indicated by arrows 66 and 67. The shafts 68 and 69 of the brushes 64 and 65 extend from the brushes along the length of the gizzard processing apparatus to the entrance end thereof, and gears 70 and 71 are rigidly mounted on the ends of the shafts 68 and 69. The gears 70 and 71 mesh with the gears 22 and 23 of the conveyor rolls 18 and 19, and a single power source (not shown) is used to rotate both cleaning brushes 64 and 65 and the conveyor rolls 18 and 19. The cleaning brushes 64 and 65 are mounted closely adjacent bottom guide 55 of second chain conveyor means 54 and have their adjacent portions rotating in an upward direction against the gizzards being moved along cleaning section 14, so that the halves of the gizzards are lifted upwardly and the upward action applied by the brushes to the gizzards tends to aid in removing loose matter from the inside of the gizzards that is usually present in poultry gizzards.

As the gizzards reach the end of cleaning section 14, they are allowed to drop down the incline of chute 74 and into the peeling section 15. Peeling section 15 comprises two pairs of counter-rotational peeler rolls 75-76 and 77-78. When the gizzards reach the first pair of peeler rolls 75-76, the peeler rolls tend to grasp the skin of the gizzards and pull the skin downwardly between the peeler rolls, while the larger bulky part of the gizzard is not pulled in this manner, and the spiral threads of the peeler rolls 75 and 76 tend to urge the gizzards toward one end of the peeler rolls, whereupon the gizzards move onto another downwardly inclined chute 79 and pass to the second pair of peeler rolls 77 and 78. The peeling function is repeated by the peeler rolls 77 and 78, until the gizzards move to the opposite end of the peeler rolls and move down the last chute 80 onto drain surface 81 where the gizzard can be inspected and handled for subsequent processing, packaging, etc.

As illustrated in FIG. 2A, the gizzards 9 are placed in random arrangement on the conveyor rolls 18 and 19, but the counter-rotational movements of the conveyor rolls tends to cause the gizzards and their gut and stomachs to seek the centerline between the conveyor rolls. The conveyor rolls are spaced apart a distance substantially less than the thickness of a typical gizzard, but the stomach and gut are so flexible and are of a small enough size so that the gut and stomach tend to fall between the conveyor rolls 18 and 19 and become suspended in a downward direction from the gizzard 9. As the conveyor rolls 18 and 19 rotate, the externally protruding spiral threads 20 and 21 tend to urge the gizzards 9 along their rectilinear path through the apparatus. In the meantime, a water spray system (not shown) continuously showers the conveyor rolls 18 and 19 and the gizzards 9 with water spray as indicated by numeral 82, and the spray of water tends not only to clean the gizzards and conveyor rolls, but also tends to induce the stomach and gut of the gizzards to pass downwardly between the conveyor rolls 18 and 19. The weight of the stomach and gut suspended below the gizzard tends to orient the gizzard so that its portion to which the stomach and gut are attached are supported on the conveyor rolls 18 and 19.

As illustrated in FIG. 2B, the first cutting disc 48 has its axis of rotation 48a displaced to the side of the adjacent flights 42 and 43 of the endless conveyor chains 29 and 30, but the diameter of first cutting disc 48 is sufficient to cause the disc to extend beneath both adjacent flights 42 and 43 and cut the stomach from the gizzard 9. The presser foot 50 tends to urge each gizzard 9 downwardly toward engagement with the first cutting disc 48 so that the disc functions effectively to remove the stomach. As illustrated in FIG. 2C, the second cutting disc 52 reaches up in between the adjacent flights 42 and 43 of the conveyor chains 29 and 30 so as to form a deep cut from the bottom surface and upwardly into each gizzard 9, thus splitting or opening up each gizzard such that the loose material normally in a poultry gizzard will be exposed.

As illustrated in FIG. 2D, each gizzard 9 is urged downwardly onto bottom guide 55 by the lower flight of the upper chain conveyor 56, causing the cut-apart halves of the gizzard to be mounted on and to straddle the bottom guide 55. Once this relationship has been established, the gizzards 9 are moved along the bottom guide 55 where they are engaged by the counter-rotating cleaning brushes 64 and 65, whereupon the side portions of the gizzards are lifted apart and exposed and brushed and vibrated to remove the loose matter normally found in poultry gizzards. Streams of water (not illustrated) are directed upwardly to wash the inside of the split gizzards to assist in the cleaning action applied to the gizzards.

As illustrated in FIG. 2E, when the gizzards have been placed in the peeling section 15, the counter-rotating peeler rolls 75 and 76 tend to hold the gizzards 9 in the approximately V-shaped channel formed by the upper surfaces of the peeler rolls, and presser feet 85 are reciprocated as indicated by double-headed arrow 86 above the peeler rolls so as to intermittently pound the gizzards 9 down into engagement with the peeler rolls 75 and 76, which induces the peeler rolls to grasp the skin of the gizzards and to pull the skin away from the gizzards. While only one foot 85 is illustrated, it will be understood that a foot 85 can be located above each of the pairs of peeler rolls 75-76 and 77-78.

While the power and control systems for the gizzard processing apparatus is not illustrated or described herein, it will be understood by those skilled in the art that motors, gear boxes, timing belts and chain drive systems can be combined in typical manner to operate the various components of the system. For example, individual motors can be utilized to drive various ones of the rotating elements, or several elements can be driven by a single motor with the use of various gear boxes and power take-off systems. Moreover, while the components of the gizzard processing apparatus 10 are illustrated without a housing, the components are located within an enclosed housing, and the gizzards moving through the system and the elements contacting the gizzards are continuously washed with water so as to remove contaminants from the gizzards and from the operating elements. This is conventional in the art and required by government regulations.

While this invention has been described in detail with particular reference to preferred embodiments thereof, it will be understood that variations and modifications can be effected within the spirit and scope of the invention as described hereinbefore and as defined in the appended claims.

What is claimed is:

1. A method of processing poultry gizzards comprising moving the gizzards in sequence on a pair of oppositely rotating spirally threaded rolls along a rectilinear path first with entrails suspended freely below the gizzards, and as the gizzards move along the path beyond the rolls engaging the gizzards on opposites sides of the gizzards with a pair of side-by-side chain conveyor means and moving the gizzards along the path with the pair of chain conveyor means, and while the gizzards are moved along the path by the pair of chain conveyor means cutting the entrails away from the gizzards, and cutting upwardly into the lower portion of the gizzards, releasing the gizzards with the pair of chain conveyor means, engaging the gizzards from above with a chain conveyor means and moving the gizzards along the path with the chain conveyor means, and while the gizzards are moved along the path by the chain conveyor means separating the portions of the gizzards cut apart by the upward cut into the gizzards and removing loose matter from inside the gizzards.

2. The method of claim 1 and further including the step of peeling the gizzards after the gizzards have been cut.

3. The method of claim 1 and wherein the step of separating the portions of the gizzards cut apart by the upward cut into the gizzards and removing the loose matter from inside the gizzards comprises brushing the opposite sides of the gizzards upwardly.

4. The method of claim 1 and wherein the step of moving gizzards along a rectilinear path comprises placing the gizzards with entrails attached onto a pair of parallel horizontal rolls each with spiral threads oppositely directed from the other roll, rotating the rolls in opposite directions with the adjacent surfaces of the rolls moving downwardly, and spraying liquid onto and about the rolls to induce the gizzards to move along the lengths of the rolls and to induce the entrails to move downwardly in between the rolls and orient the gizzards on the rolls.

5. A method of processing poultry gizzards comprising placing the gizzards with entrails attached on a pair of counter rotating spaced apart spirally threaded rolls and moving the gizzards along the rolls with the entrails suspended below the rolls, engaging the gizzards with chain conveyor means and moving the gizzards with the chain conveyor means and with entrails suspended downwardly therefrom along a path beyond the rolls, cutting the entrails away from the gizzards with a disc cutter rotatable about an upwardly extending axis as the gizzards are moved by the conveyor means, cutting upwardly into the gizzards with a disc cutter rotatable about an axis transverse to the direction of movement of the gizzards as the gizzards are moved by the conveyor means, and brushing upwardly against the gizzards with a pair of counter rotating brush elements on opposite sides of the gizzards to separate the cut apart portions of the gizzards and to remove loose matter from inside the gizzards as the gizzards are moved by the conveyor means.

6. The method of claim 5 and wherein the step of engaging the gizzards with chain conveyor means comprises engaging the gizzards from opposite sides with adjacent flights of a pair of chain conveyors, and wherein the step of cutting upwardly into the gizzards with a disc cutter comprises cutting upwardly between the adjacent flights of the pair of chain conveyors.

* * * * *